United States Patent [19]

Zoerner

[11] Patent Number: 4,636,587
[45] Date of Patent: Jan. 13, 1987

[54] ELECTRONIC SWITCH FOR DIGITAL TELEPHONE

[75] Inventor: Glen J. Zoerner, Austin, Tex.

[73] Assignee: Motorola, Inc., Schaumburg, Ill.

[21] Appl. No.: 776,314

[22] Filed: Sep. 16, 1985

[51] Int. Cl.⁴ ...................... H04M 1/00; H04M 19/00
[52] U.S. Cl. .................................. 379/377; 379/387; 379/413
[58] Field of Search ............... 179/81 R, 84 R, 84 A, 179/84 VF, 70, 77, 18 BC

[56] References Cited

U.S. PATENT DOCUMENTS 4,493,949 1/1985 Retallack et al. .............. 179/18 BC

*Primary Examiner*—James L. Dwyer
*Attorney, Agent, or Firm*—John Fisher; Jeffrey Van Myers; Robert L. King

[57] ABSTRACT

An electronic switch for supplying power to a digital telephone which consumes substantially no power in the idle mode. A transistor for supplying power to the digital telephone is latched on in either of two situations. In the first situation, the telephone's hookswitch is closed. A second transistor turns on and maintains the first transistor on even after the hookswitch has been opened. In the second situation, a voltage pulse is applied to the input voltage conductor lines causing the first and second transistors to turn on. Again, the second transistor maintains the first transistor on. The circuit is inactivated by a sleep signal which turns off the second transistor which in turn turns off the first.

8 Claims, 2 Drawing Figures

ELECTRONIC SWITCH FOR DIGITAL TELEPHONE

BACKGROUND OF THE INVENTION

This invention relates generally to digital telephones, and more particularly to an electronic switch for supplying power to the circuitry of a digital telephone.

The well known and traditional analog type telephones consume virtually no power when the telephone is on hook. The telephone circuitry is alerted by a high voltage signal which causes the bell at the telephone to ring. When the receiver of the telephone is picked up causing the telephone to go off-hook in response to a ring, the telephone begins to consume power.

New standards are being proposed which will result in digital services replacing existing analog telephones, such digital services including voice and high speed data transmission capabilities. Unlike analog telephones, the circuitry of a digital telephone must typically remain active in order that an incoming signal be detected. Typically, power consumption in the idle state is on the order of 200 milliwatts including line and conversion losses. This has been true notwithstanding that during idle conditions, nonessential circuits are deactivated to reduce power consumption. Forthcoming recommendations suggest that idle power consumption be less than 100 milliwatts with a goal of 25 milliwatts.

SUMMARY OF THE INVENTION

It is an object of the present invention to provide an improved digital telephone.

It is a still further object of the present invention to provide an improved electronic switch for supplying power to the circuitry of a digital telephone.

According to a broad aspect of the invention there is provided an electronic switch for supplying power to a digital telephone which consumes substantially no power in the idle mode and includes a hookswitch, comprising first input means coupled to receive a source of power; an output terminal for supplying power to said telephone; second input means coupled to receive a disabling signal for deactivating said electronic switch; first switching means coupled to said first input means for momentarily turning on in response to an input signal; second switching means coupled to said first switching means and to said output terminal for turning on when said first switching means turns on and supplying power to said output terminal; and third switching means coupled to said second switching means, to said hookswitch, and to said second input means for (a) turning on when said second switching means turns on to maintain said second switching means on after said first switching means turns off, and (b) turning on when said hookswitch is closed causing said second switching means to turn on and supply power to said output terminal, said third switching means remaining on after said hookswitch is again opened, said third switching means turning off when said disabling signal is received causing said second switching means to turn off.

BRIEF DESCRIPTION OF THE DRAWINGS

The above and other objects, features and advantages of the present invention will be more clearly understood from the following detailed description taken in conjunction with the accompanying drawings in which.

DESCRIPTION OF THE PREFERRED EMBODIMENT

Figure 1:
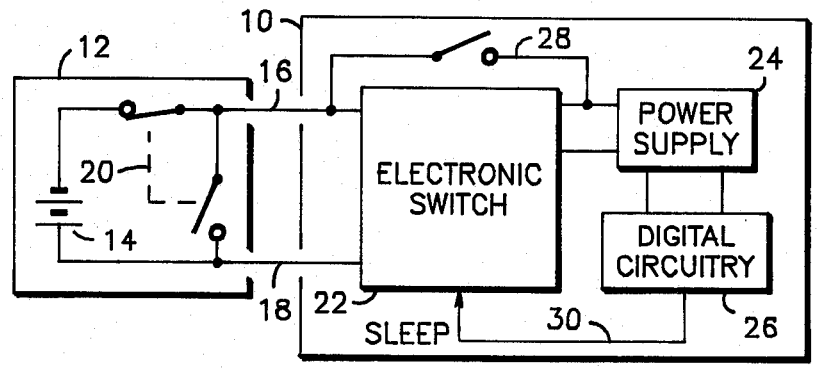
FIG. 1 is a block diagram illustrating a digital telephone system in accordance with the teachings of the present invention.

FIG. 1 is a block diagram of a digital telephone power system including a digital telephone 10 and line card 12 which acts as the interface between telephone or terminal 10 and a PBX or call switching machine (not shown). Line card 12 includes a DC power source 14 (typically 48 volts) for supplying a voltage across lines 16 and 18. Interface card 12 also includes a wake-up switch denoted generally 20 the function of which will be described hereinafter.

Telephone 10 includes an electronic switch 22 which receives the voltage appearing on lines 16 and 18. The output of electronic switch 22 is coupled to power supply 24 which converts the voltage appearing on line 16 and 18 to a second voltage suitable for driving digital circuitry 26 which may include a microprocessor (not shown). The well known hook switch 28 has a first terminal coupled to line 16 and a second terminal coupled to the switched power output of the electronic switch 22. Finally, digital circuitry 26 provides a sleep signal over line 30 which is applied to electronic switch 22 for reasons to be discussed hereinbelow.

Figure 2:
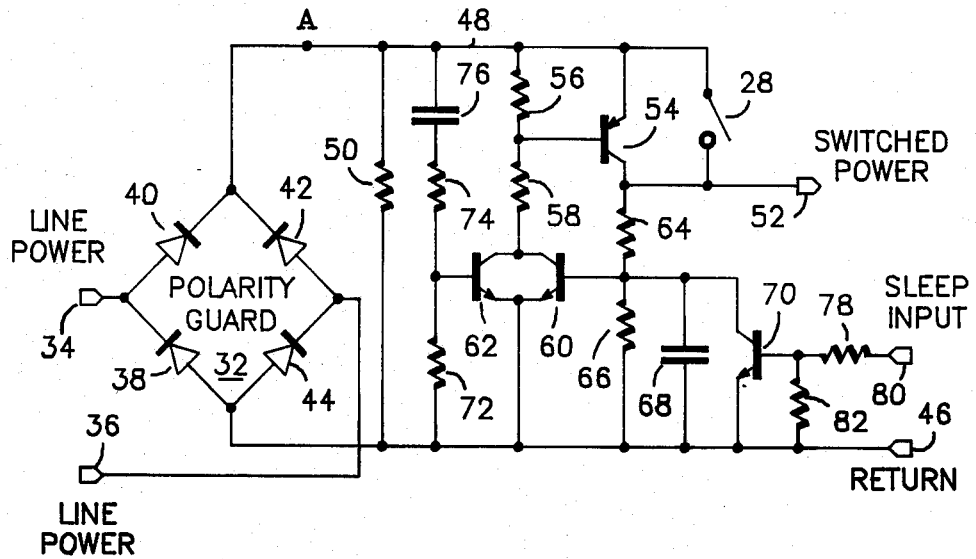
FIG. 2 is a schematic diagram illustrating in detail the electronic switch shown in FIG. 1.

FIG. 2 is a schematic diagram of the electronic switch shown in FIG. 1. The line power appearing in lines 16 and 18 is applied to a polarity guard 32 via line power terminals 34 and 36. Polarity guard 32 consists of four diodes 38, 40, 42 and 44 connected as shown to assure that the voltage appearing at node A on line 48 is positive with respect to the voltage appearing at the return (terminal 46). That is, if the voltage appearing at terminal 34 is positive with respect to that appearing at terminal 36, current will flow through diode 40, node A, resistor 50, and diode 44 to terminal 36. If the voltage appearing at terminal 36 is positive with respect to that appearing at terminal 34, current will flow via diodes 42, node A, resistor 50, and diode 38.

Hook switch 28 is shown coupled between line 48 and the switched power output terminal 52. A PNP transistor 54 has an emitter coupled to line 48, a collector coupled to output terminal 52 and a base coupled to the junction of resistors 56 and 58. The second end of resistor 56 is coupled to line 48, and the second end of resistor 58 is coupled to the collectors of transistors 60 and 62. The emitters of NPN transistor 60 and 62 are coupled together and to return terminal 46. The base of transistor 60 is coupled to the junction of resistors 64 and 66, to a first terminal of capacitor 68, and to the collector of NPN transistor 70. A second end of resistor 64 is coupled to power output terminal 52, and a second end of resistor 66 is coupled to return terminal 46. The second terminal of capacitor 68 is coupled to return terminal 46 as is the emitter of transistor 70.

The base of transistor 62 is coupled to return terminal 46 via resistor 72 and to line 48 via resistor 74 and capacitor 76. The base of transistor 70 is coupled, via resistor 78 to terminal 80 which receives a sleep signal from digital circuitry 26 (FIG. 1). Finally, resistor 82 is coupled across the base of transistor 70 and return 46.

During idle periods, the electronic switch is open and power consumption is virtually zero except for leakage through bleed resistor 50. Bleed resistor 50 is relatively large (20 megaohms) and thus power consumed during idle periods is very small (e.g. 100 microwatts). The circuit may be energized in two different ways. First, if the handset is lifted, hook switch 28 closes. This causes current to flow via resistor 64 to the base of transistor 60 turning it on. With transistor 60 on, current is drawn through the base-emitter of transistor 54 turning it on. With transistor 54 turned on, power is available at the switched power output terminal 52. Should hook switch 28 now be closed, transistor 54 will remain on. In order to deactivate the circuit, a sleep signal generated by digital circuitry 26 is applied to the base of transistor 70 via limiting resistor 78 and sleep input terminal 80. This causes transistor 70 to turn on discharging capacitor 68. This causes the voltage at the base of transistor 60 to fall turning transistor 60 off thus preventing any current from flowing in the base of transistor 54. Thus, transistor 54 turns off and the electronic switch 22 is inactivated, along with power supply 24 and digital circuiting 26.

The value of resistor 64 is chosen to be relatively high so as to set up a charging time constant with capacitor 68. This prevents capacitor 68 from charging too rapidly and allows sufficient time for the base-emitter voltage of transistor 60 to rise. In this manner, transistor 54 turns completely off before transistor 60 can be turned on again. Resistors 82, 72, 66 and 56 are pull-down resistors which prevent transistors 70, 62, 60 and 54 respectively from turning on due to leakage current.

The switch of FIG. 2 must also be turned on if there is an incoming telephone call. This is accomplished as follows. When a call comes in, the normally closed portion of wake-up switch 20 opens and the normally opened portion closes. This causes capacitor 76 to begin discharging through resistor 50. A short time later (approximately 100 milliseconds) after the voltage between lines 16 and 18 has gone to zero, the states of the normally closed and normally opened positions of wake-up switch 20 are reversed and a pulse of voltage is applied to lines 16 and 18. Capacitor 76 begins charging causing current to flow in the base of transistor 62 turning it on momentarily. The time constant is chosen to be long enough to keep transistor 62 on long enough to allow transistor 54 to turn on. Thus, as with the case previously, the circuit is latched on and power is applied to the switch power output terminal 52. When capacitor 76 fully charges, transistor 62 will turn off; however, transistor 54 will remain on and, due to the increased voltage at the base of transistor 60, transistor 60 will turn on. The circuit may be deactivated in a manner described above; i.e. the application of a sleep signal to sleep input terminal 80. If, for example, no one were available to answer the phone, the PBX would generate a signal and transmit it to digital circuitry 26 which would likewise result in a generation of a sleep signal.

Thus, there has been provided an electronic switch which, during the idle state, consumes virtually no power. The switch may be controlled locally (i.e. by the hook switch) or remotely from the line card. When the line card wants to activate the telephone, DC power on the line is pulsed off and then on again. This action latches the electronic switch on. The electronic switch is activated and digital communication between the telephone and the line card is established. If the user wishes to make a call, a mechanical hook switch is closed, furnishing power to the circuitry. This also causes the electronic switch to be latched. When the call is completed, the sleep signal is generated which causes the circuit to disable.

The above description is given by way of example only. Changes in form and detail may be made by one skilled in the art without the parting from the scope of the invention as defined by the appended claims.

I claim:

1. An electronic switch for supplying power to a digital telephone which consumes substantially no power in the idle mode and includes a hookswitch, comprising:
   first input means coupled to receive a source of power;
   an output terminal for supplying power to said telephone;
   second input means coupled to receive a disabling signal for deactivating said electronic switch;
   first switching means coupled to said first input means for momentarily turning on in response to an input signal;
   second switching means coupled to said first switching means and to said output terminal for turning on when said first switching means turns on and supplying power to said output terminal; and
   third switching means coupled to said second switching means, to said hookswitch, and to said second input means for
   (a) turning on when said second switching means turns on to maintain said second switching means on after said first switching means turns off, and
   (b) turning on when said hookswitch is closed causing said second switching means to turn on and supply power to said output terminal, said third switching means remaining on after said hookswitch is again opened,
   said third switching means turning off when said disabling signal is received causing said second switching means to turn off.

2. An electronic switch according to claim 1 wherein said first input means comprises first and second current conductors;

3. An electronic switch according to claim 2 wherein said first switching means comprises:
   a first resistor coupled across said first and second voltage conductors;
   a first capacitor having a first terminal coupled to said first voltage conductor and a second terminal coupled to said second voltage conductor; and
   a first transistor having a base coupled to the second terminal of said capacitor, an emitter coupled to said second voltage conductor and a collector coupled to said second switching means.

4. An electronic switch according to claim 3 wherein said third switching means comprises:
   a second transistor having a base coupled to said second input means and to said hook switch, an emitter coupled to said second voltage conductor and a collector coupled to said second switching means.

5. An electronic switch according to claim 4 wherein said second switching means comprises:
   a third transistor having a base coupled to the collectors of said first and second transistors and to said first voltage conductor, an emitter coupled to said first voltage conductor and a collector coupled to said output terminal and to the base of said second transistor.

6. An electronic switch according to claim 5 wherein said second input means comprises:
   a fourth transistor having a base coupled to receive said disabling signal, an emitter coupled to said second voltage conductor and a collector coupled to the base of said second transistor; and
   a second capacitor having the first terminal coupled to the base of said second transistor and the collector of said fourth transistor and having a second terminal coupled to said second voltage conductor.

7. An electronic switch according to claim 6 further comprising a polarity guard coupled between said first and second voltage conductors for receiving said source of power.

8. An electronic switch for supplying power to a digital telephone which consumes substantially no power in the idle mode and includes a hookswitch, comprising:
   first input means coupled to receive a source of power;
   an output terminal for supplying power to said telephone;
   second input means coupled to the switch and to receive a disabling signal for deactivating said switch;
   switching means for supplying power to said telephone via said output terminal;
   first means coupled to said switching means for latching said switching means on after said hookswitch has been closed; and
   second means coupled to said switching means and to said first input means for latching said switching means on upon receipt of an input signal by said first input means.

* * * * *